US006082668A

United States Patent [19]

Saiz

[11] Patent Number: 6,082,668

[45] Date of Patent: Jul. 4, 2000

[54] AIRCRAFT AND HIGH SPEED VEHICLES

[76] Inventor: Manuel Munoz Saiz, San Emilio 16, 1-3, 28017 Madrid, Spain

[21] Appl. No.: 09/095,957

[22] Filed: May 4, 1998

[30] Foreign Application Priority Data

Sep. 6, 1996 [ES] Spain .................................... 9601904

[51] Int. Cl.[7] ................................ B64C 1/00; B64C 3/00

[52] U.S. Cl. ......................... 244/36; 249/34 R; 249/35 R

[58] Field of Search ............................... 244/34 R, 35 A, 244/35 R, 36, 119, 130, 12.1

[56] References Cited

U.S. PATENT DOCUMENTS 5,711,494 1/1998 Saiz ....................................... 244/12.1

OTHER PUBLICATIONS

US Air Force Museum Photo Archives, Northrop–McDonnell Douglas YF–23 (2 photos), 1990.

*Primary Examiner*—Peter M. Poon
*Assistant Examiner*—Charles R Ducker, Jr.
*Attorney, Agent, or Firm*—Robert M. Schwartz

[57] ABSTRACT

Improvement to aircraft and high speed vehicles, consisting of setting the vehicle nose in an upward inclination with a flat wall on the bottom which, running from the underside of the fuselage, is inclined forward until its upper zone. The inclined wall exploits the frontal incident air to create lift and, because of the angle which it forms, frontal drag is the same as that of a conventional vehicle fuselage, having the tail inclined downward with a flat wall in the upper part running from the top of the fuselage and sloping backwards as far as its bottom area, to exploit the suction of the rear air to create major lift and, because of its angle, the tail drag is the same as that of a conventional vehicle.

13 Claims, 2 Drawing Sheets

$L_W$ $L_N$ $L_T$

1

4

2

$D_N$ $D_T$

3

5

$L_{T_p}$

W

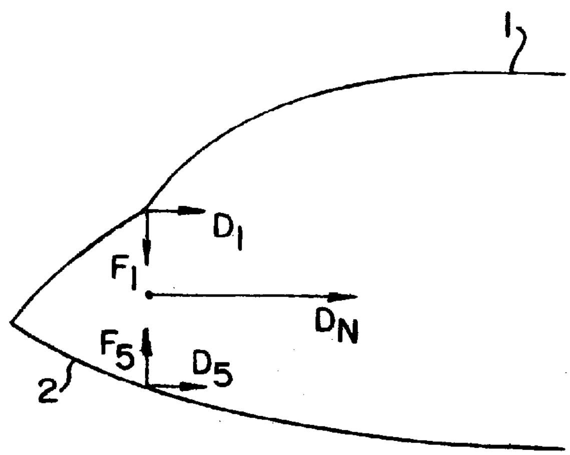
FIG - 1 -
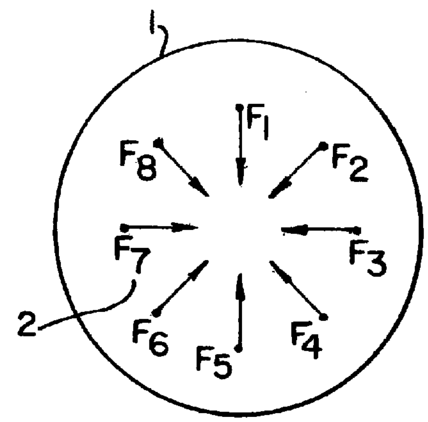
FIG - 2 -
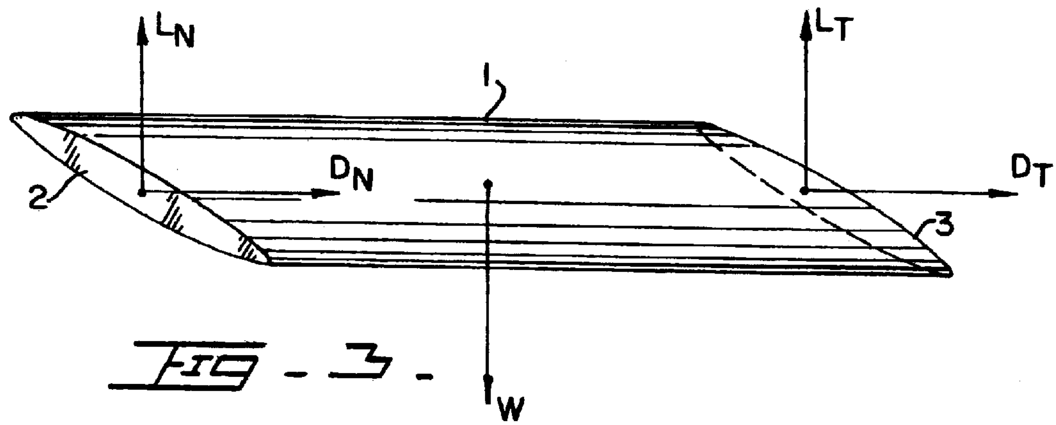
FIG - 3 -
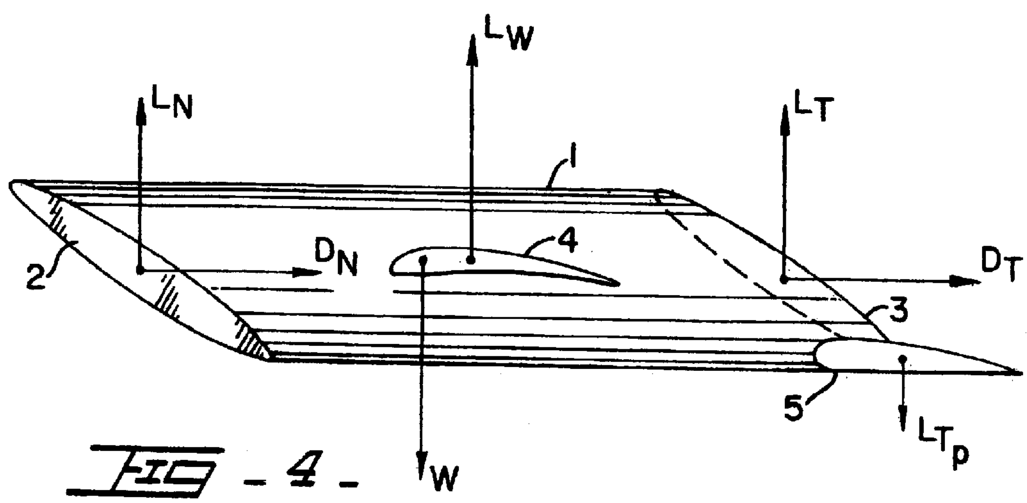
FIG - 4 -

AIRCRAFT AND HIGH SPEED VEHICLES

BACKGROUND OF THE INVENTION

1. Field of the Invention

High speed vehicle fuselages.

2. State of the Prior Art

Existing high-speed vehicle fuselages have a front and/or rear layout in some cases which is conical or similar to deflect the air radially while, in other cases, they pressure the vehicle into the ground without any way taking advantage of slipstream energy

BRIEF DESCRIPTION OF THE INVENTION

The improvement to aircraft or high-speed vehicles in this invention consists of setting the vehicle nose in an upward inclination with a flat wall on the bottom which, running from the underside of the fuselage, is inclined forward until meeting its upper zone. Said inclined wall exploits the frontal incident air to create major lift and, because of the angle which it forms, frontal resistance is the same as that of a conventional vehicle fuselage. The tail is inclined downward, with a flat wall in the upper part running from the top of the fuselage and sloping backwards as far as its bottom area, to exploit the suction of the rear air to create major lift and, because of its angle, the tail resistant is the same as that of a conventional vehicle.

The flat part of the invention may be slightly curved both on the nose and tail.

A variant makes use at the nose and tail of two oblique pyramid forms linked around their base to the vehicle fuselage and inclined so that the apothem or edge of the upper surface of the pyramid is in line with and forms a continuation of the upper longitudinal axis of the vehicle fuselage.

A further variant has two oblique cone forms, at the nose and tail, linked around their bases to the vehicle fuselage and inclined so that the upper generatrix of the cone is in line with and forms a continuation of the upper longitudinal axis of the vehicle fuselage.

The connection between these inclined surfaces, pyramids or cones and the fuselage is smooth, with edges or sharp angles rounded.

Said nose and/or tail inclinations are useful in aircraft and mono-rail trains which do not require pressure into the ground or track.

The angle of inclination can be calculated according to the vehicle and the standard or cruising of the vehicle so that the weight in the area is equal to the lift at said cruising speed, with the need to counteract the weight at low speeds with fins or, in the case of trains, simply with the wheels.

With aircraft, the moments generated by the forces both statically and dynamically ought to tend to stabilize themselves. This is possible in part because the resulting forces at the nose and tail are counteracted by the generation of opposing moments in relation to the center of gravity or the points of application of that resulting from the lift.

The control cab can be installed at any point on the inclined surface, ramp, lower apothem of the pyramid or on the lower generatrix of the frontal cone.

BRIEF DESCRIPTION OF THE DRAWINGS

FIG. 1 shows a side view of the nose of an aircraft, with the aerodynamic forces and resistances acting on a portion of the upper and lower zone, and the total resistance it causes.

FIG. 2 is a frontal view of the nose of an aircraft, with the radial forces generated there.

FIG. 3 shows a diagramed perspective side view of a monorail train with the arrangement of this invention.

FIG. 4 shows a diagramed perspective side view of an aircraft with the arrangement of this invention.

MORE DETAILED DESCRIPTION OF THE DRAWINGS

Figure 5:
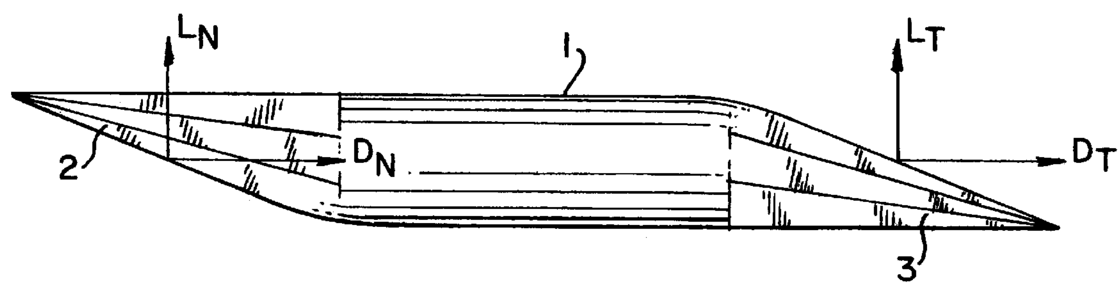
FIG. 5 and FIG. 6 show diagramed side views of two-high-speed vehicles.

FIG. 1 consists of the fuselage 1, the nose 2, the upper and lower partial forces perpendicular to the longitudinal axis $F_1$ and $F_5$, their partial draft $D_1$ and $D_5$ in which the incidental ram air forces are split, where the total frontal drag is $D_N$.

FIG. 2 consists of the fuselage 1, the nose 2, radial or perpendicular to the longitudinal axis forces $F_1$ to $F_8$, opposite among them and which are wasted.

FIG. 3 consists of the fuselage 1, the nose 2, the tail 3, the nose lift $L_N$, the tail lift $L_N$, the tail lift $D_T$ and the train weight W.

FIG. 4 consists of the fuselage 1, the nose 2, the tail 3, the wing 4, the stabilizer and elevator 5, the nose lift $L_N$, the nose drag $D_N$, the tail lift $L_T$, the tail drag $D_T$ and the stabilizer and elevator lift $L_{TP}$, the wing lift $L_W$ and the aircraft weight W.

FIG. 5 consists of the fuselage 1, the pyramidal nose 2, the tail 3, the nose lift $L_N$, the nose drag $D_N$ and the tail lift $L_T$.

Figure 6:
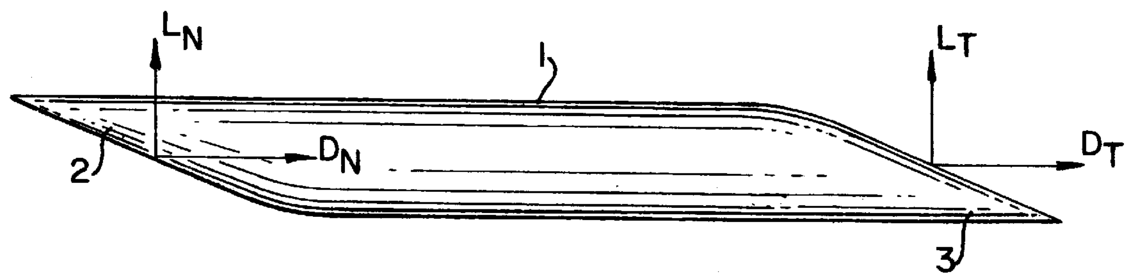

FIG. 6 consists of the fuselage 1, the conical nose 2, the tail 3, the nose lift $L_N$, the nose drag $D_N$ and the tail lift $L_T$.

What is claimed is:

1. An improved aircraft comprising:

an elongated fuselage having a longitudinal axis;

an upper longitudinal axis, along the upper most portion of said fuselage, parallel to said longitudinal axis;

a lower longitudinal axis, parallel to said longitudinal axis, along the length of the bottom of said fuselage;

said fuselage having a nose portion at one end and a tail portion at its opposite end;

said nose portion of said fuselage having an upwardly inclined front wall extending upwardly from said bottom of said fuselage to at least said upper longitudinal axis of said fuselage;

said tail portion of said fuselage having a downwardly declining rear wall extending from said upper longitudinal axis to said bottom of said fuselage.

2. An aircraft according to claim 1, wherein said front wall is curved.

3. An aircraft according to claim 1, wherein said rear wall is curved.

4. An aircraft according to claim 1, wherein said nose portion is in the form of an oblique pyramid linked around its base to said fuselage and inclined so that the apothegm or edge of the upper surface of said pyramid is in line with and forms a continuation of said upper longitudinal axis of said fuselage.

5. An aircraft according to claim 1, wherein said tail portion is in the form of an oblique pyramid linked around its base to said fuselage and inclined so that the apothegm or edge of said lower surface of the pyramid is in line with and forms a continuation of said lower longitudinal axis of said vehicle fuselage.

6. An aircraft according to claim 1, wherein said nose is in the form of an oblique cone linked around its base to said fuselage and inclined so that the upper generatrix of said cone is in line with and forms a continuation of said upper longitudinal axis of said fuselage.

7. An aircraft or other high-speed vehicle according to claim 1, wherein said tail portion is in the form of an oblique cone linked around its base to said fuselage and inclined so that the lower generatrix of said cone is in line with and forms a continuation of said lower longitudinal axis of said fuselage.

8. An aircraft according to claim 1, wherein the connection between the inclined surfaces of said front wall and said fuselage is smooth, with edges or sharp angles rounded.

9. An aircraft according to claim 1, whereby the bottom of said rear wall extends downwardly to at least said lower longitudinal axis of said fuselage.

10. An aircraft according to claim 1, whereby the angle of inclination of said front wall relative to said longitudinal axis is a factor of the weight of said aircraft.

11. An aircraft according to claim 10, whereby at low speeds the relative weight of said aircraft can be relatively adjusted using fins in contact with frontal incident air to said fins which are a part of said aircraft.

12. An improved aircraft comprising:

an elongated fuselage having a top and a bottom, said fuselage having a nose portion at one end and a tail portion at its opposite end, said nose portion of said fuselage having an upwardly inclined front wall extending from said bottom of said fuselage to said top of said fuselage;

said tail portion of said fuselage having a downwardly declining rear wall extending from said top of said fuselage to said bottom of said fuselage, whereby said nose portion of said fuselage creates upward forces and no downward forces relative to frontal incident air to said fuselage.

13. An aircraft according to claim 12, whereby said tail portion of said fuselage creates upward forces and no downward forces relative to frontal incident air to said fuselage.

* * * * *